United States Patent [19]
McMurtrey

[11] Patent Number: 4,501,435
[45] Date of Patent: Feb. 26, 1985

[54] WELDED STEM ASSEMBLY

[76] Inventor: David K. McMurtrey, Rte. 2, Box 154G, Maysville, Ky. 41506

[21] Appl. No.: 424,004

[22] Filed: Sep. 27, 1982

[51] Int. Cl.³ ............................................. B62K 21/18
[52] U.S. Cl. .................................... 280/279; 29/150; 74/551.1; 403/191
[58] Field of Search ............... 280/279, 280; 74/551.1, 74/551.2, 551.3, 551.6, 551.7; 29/150; 403/191, 235, 374

[56] References Cited

U.S. PATENT DOCUMENTS

| D. 31,007 | 6/1899 | Metz | D12/118 |
|---|---|---|---|
| D. 120,650 | 5/1940 | Pawsat | D12/118 |
| D. 146,119 | 12/1946 | Pawsat | D12/118 |
| D. 204,182 | 3/1966 | Pawsat | D12/118 |
| D. 205,823 | 9/1966 | Pawsat | D12/118 |
| 500,941 | 7/1893 | Perkins | 403/190 |
| 689,217 | 12/1901 | Palmer | 74/551.3 |
| 1,215,763 | 2/1917 | Beatty | 403/191 |
| 1,398,447 | 11/1921 | Smith | 74/551.2 |
| 1,470,627 | 10/1923 | Lamplugh | 403/191 |
| 1,791,985 | 2/1931 | Van Valkenberg | 228/144 |
| 1,932,251 | 10/1933 | Nauts | 280/270 |
| 2,224,515 | 12/1940 | Karsikas | 403/235 |
| 2,274,747 | 3/1942 | Schwinn | 74/551.2 |
| 2,366,061 | 12/1944 | Schwinn | 74/551.3 |
| 2,414,275 | 1/1947 | Schwinn | 74/551.4 |
| 2,487,661 | 11/1949 | McCauley | 74/551.6 |
| 2,505,648 | 4/1950 | Pawsat | 74/551.1 |
| 3,310,325 | 3/1967 | McCauley | 403/377 |
| 3,361,455 | 2/1968 | Hussey et al. | 403/191 |
| 3,385,615 | 5/1968 | Hussey | 403/235 |
| 3,605,248 | 9/1971 | Yoshikawa | 228/173 R |
| 3,722,930 | 3/1973 | Humlong | 403/395 |
| 3,941,011 | 3/1976 | Kirk | 74/551.2 |
| 4,322,087 | 3/1982 | Addicks | 280/279 |
| 4,337,962 | 7/1982 | Allen et al. | 280/279 |

FOREIGN PATENT DOCUMENTS

| 2717316 | 10/1978 | Fed. Rep. of Germany . | |
| 986319 | 3/1951 | France | 403/374 |
| 331445 | 9/1930 | United Kingdom . | |
| 479213 | 2/1938 | United Kingdom | 403/191 |
| 666747 | 2/1952 | United Kingdom | 74/551.1 |

OTHER PUBLICATIONS

Catalog Excerpts-Wald Manufacturing Company, pp. 130-138, Nikko.

Primary Examiner—Joseph F. Peters, Jr.
Attorney, Agent, or Firm—Wood, Herron & Evans

[57] ABSTRACT

A bicycle handlebar stem assembly for securing the handlebars to the front fork of a bicycle frame. The stem assembly includes a separate tubular barrel and a sheet metal head section which are made in separate operations and connected by welding longitudinally extending edges of the head to opposite sides of the barrel to form the completed stem assembly.

16 Claims, 7 Drawing Figures

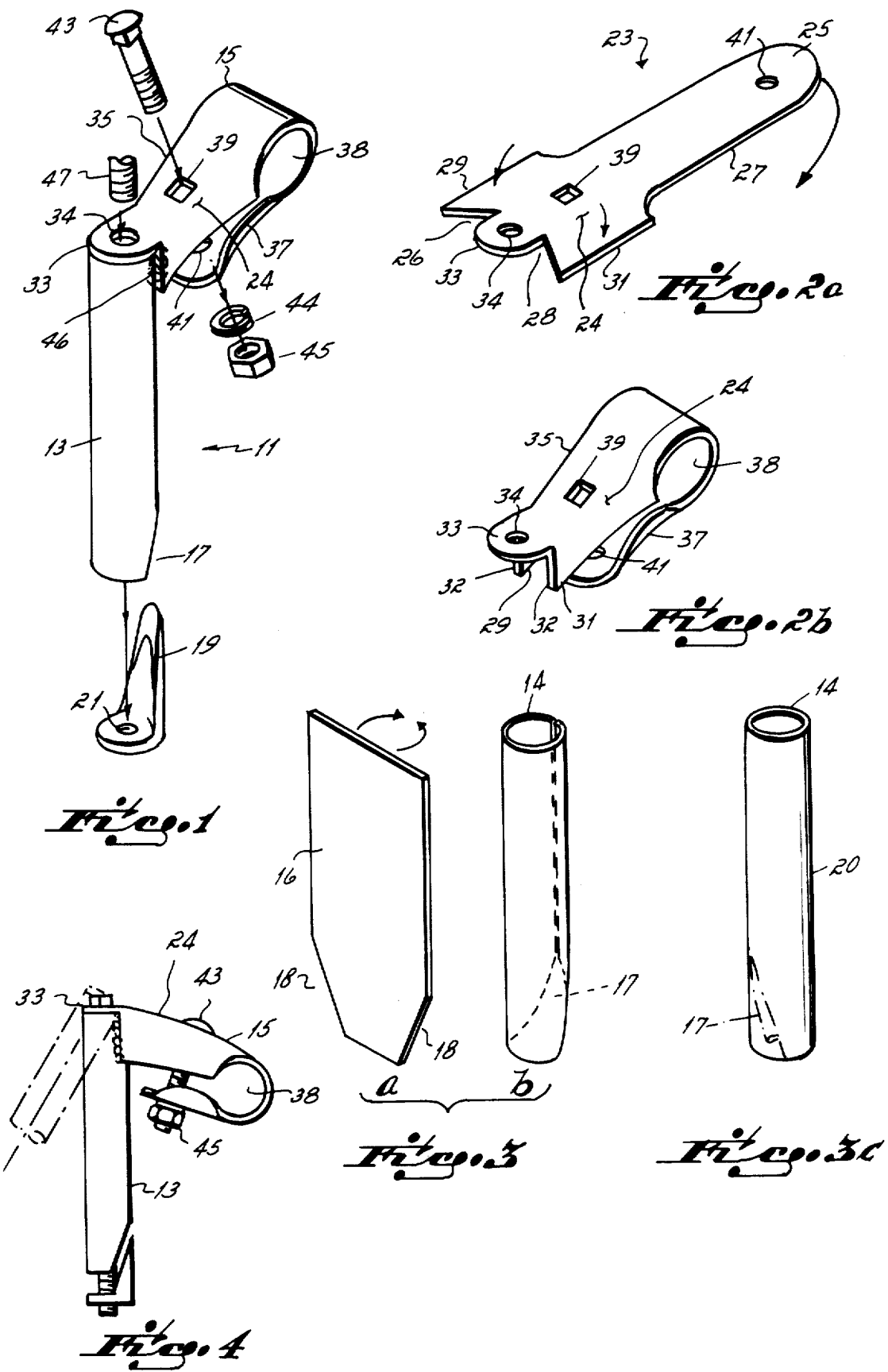

WELDED STEM ASSEMBLY

FIELD OF THE INVENTION

This invention relates generally to bicycles and more particularly to stem assemblies for adjustably interconnecting handlebars to the front forks of bicycles.

BACKGROUND OF THE INVENTION

There are a variety of stem assemblies for securing the handlebars of a bicycle to the front fork of a bicycle frame. Such assemblies generally consist of a tubular barrel portion which connects to the front wheel fork of a bicycle frame and a head portion which is adapted to receive and clamp the bicycle handlebars. These stem assemblies generally are either made as a single piece unitary item or as a two-piece item. If made in two pieces, one piece is a tubular barrel and the other piece is a clamping head which is welded or brazed to the barrel. Examples of such two-piece stems are disclosed in U.S. Pat. No. 4,322,087 and German Pat. No. 2,717,316.

One piece stems are generally made either from machined forging or from die stamped and formed sheet metal. One example of a one-piece sheet metal stem is disclosed in U.S. Pat. No. 2,505,648.

One-piece sheet metal stem assemblies have heretofore been very popular because of their effectiveness in safely securing handlebars to the frame of bicycles and the economics of their manufacture. The economics of the one-piece sheet metal stem derive from the fact that the one piece stem is made from relatively inexpensive sheet metal with a minimum of hand labor. But such one-piece stems require a very large capital expenditure for the dies and tooling utilized in manufacturing such relatively complex shaped parts. Furthermore, it is relatively expensive to maintain complex tooling in a condition in which it consistently produces high quality parts without weak points in the stem subject to failure. The throat area of the one-piece stem between the barrel and head is particularly subject to failure if improperly shaped and configured. If imperfectly formed as, for example, by worn or improperly maintained tooling, the resulting stem is subject to failure in use and particularly to fatigue failure.

An alternative to forming the stem as a unitary structure upon relatively expensive tooling has been to form the stems as two pieces and then weld or braze those pieces together. But to date, no two-piece stem structure has been available which has both the rugged strength required for safe bicycle usage and the favorable economics of manufacture which would enable it to compete effectively with one-piece sheet metal stems.

Therefore, it has been one objective of this invention to provide a bicycle stem assembly which is as rugged and resistant to failure in use as prior art one-piece stems, but which may be manufactured without the need for the expensive tooling heretofore required for the manufacture of one-piece sheet metal stems.

It has been another object of this invention to provide a strong, rugged two-piece stem assembly which may be made from sheet metal.

Still another objective of this invention has been to provide a bicycle stem assembly which may be manufactured less expensively and with less expenditures for tooling than current one-piece sheet metal stems, but which is equally as strong and resistant to failure in use.

SUMMARY OF THE INVENTION

These and other objectives are accomplished in the stem assembly of this invention wherein a separate tubular barrel and head section are adapted to be connected together by welding or other suitable means. The tubular barrel may be cut from an elongated tube section, or formed from flat sheet stock in a progressive die. The head section is fabricated in a progressive die from flat sheet stock such that the formed head section includes a handlebar clamping section at one end, a lip section at the other end and a pair of spaced, side sections extending downwardly from and perpendicular to the lip section.

Once the tubular barrel and head section are formed, the head section is placed in abutment with the tubular barrel such that its lip section extends over the top end of the barrel and the two side sections abut the side of the barrel. The two side sections are then welded to the barrel forming the completed stem assembly.

DESCRIPTION OF THE DRAWINGS

The structure, operation and advantages of this invention will become apparent upon consideration of the following description taken in conjunction with the accompanying drawings wherein:

FIG. 1 is an exploded view of one embodiment of the stem assembly of this invention;

FIG. 2a is a perspective view of the sheet metal head section in a flat condition illustrating the shape of the flat sheet required to form the completed head sections;

FIG. 2b is a perspective view of the completed formed head section;

FIG. 3a is a perspective view of the sheet metal tubular barrel in a flat condition illustrating the shape of the flat sheet required to form the completed tubular barrel;

FIG. 3b is a perspective view of the completely formed barrel;

FIG. 3c is a perspective view of a preformed tube which may be cut to form the tubular barrel of this invention; and FIG. 4 is a side view of an alternate embodiment of the stem assembly herein.

DETAILED DESCRIPTION OF THE INVENTION

Referring now to the drawings and in particular FIG. 1, a bicycle stem assembly is shown and labeled generally with the reference numeral 11. The stem assembly 11 includes a tubular barrel 13 connected to a head section 15 in a manner described below. The barrel 13 and head section 15 are separate pieces made in different operations and then connected together in a welding operation to form the completed stem assembly 11.

The tubular barrel 13 is formed with a generally flat or planar upper end 14 and a lower chamfered end 17. The chamfered end 17 is adapted to receive a wedge nut 19 having a threaded central bore 21. This configuration of tubular barrel 13 is in one preferred embodiment made from a flat section of metal stock 16 formed by a progressive die into a tube shape. As shown in FIG. 3, the metal stock 16 is provided with tapered edges 18 at the lower end so that the chamfered end 17 is automatically formed when the metal stock 16 is shaped into a tube form. Alternately, a section 20 may be cut from a length of tubing for use as a tubular barrel 13. A separate machining operation is then required to form the chamfered end 17 on tube section 20.

The head section 15 of stem assembly 11 is formed in a multiple stage profiling and forming progressive die as partially schematically indicated in FIGS. 2a and 2b. A tongue-shaped section labeled with the reference numeral 23 is profiled from flat metal stock to form the configuration shown in FIG. 2a. The tongue-shaped section 23 includes an elongated intermediate portion 27 disposed between a curved end portion 25 and a top portion 24. A pair of side sections 29 and 31 extend laterally from the top portion 24. At the end opposite the curved end 25 there is a rounded lip section 33 having a cental bore 34. Cut-outs or recesses 26 and 28 are formed between the lip section 33 and the side sections 29, 31, respectively.

The completed head section 15 is formed by bending the side sections 29, 31 downwardly so that they are disposed perpendicularly to the lip section 33. The intermediate portion 27 is bent underneath the lip section 33 and side sections 29, 31 in a U-shape forming an upper half section 35, and a lower half section 37 extending part way beneath the upper half section 35 and spaced therefrom. These profiling and bending operations may be accomplished in a progressive die or by any other suitable means. The upper and lower half sections 35, 37 form an annular sleeve section 38 which is adapted to receive and clamp the handlebars of a bicycle (not shown). An upper square hole 39 is formed in the upper half section 35 adjacent to the central bore 34 in lip section 33, and a lower round hole 41 is formed in the lower half section 37 adjacent the curved end 25. The upper and lower holes 39, 41 align with one another when the head section 15 is completely formed and are adapted to receive a bolt 43 passing therethrough which is secured by a washer 44 and nut 45. The bolt 43 is operable to be tightened and urge the upper and lower half sections 35, 37 together so that the handlebars are tightly clamped within annular sleeve section 38.

The completed stem assembly 11 of this invention is formed by connecting the head section 15 to the tubular barrel 13. This is accomplished by placing the lip section 33 of head section 15 over the upper end 14 of tubular barrel 13, so that the edges 32 of side sections 29, 31 contact the side of tubular barrel 13 in which the slot 17 is formed. In this position, the edge 32 of each side section 29, 31 is longitudinally welded to the side of tubular barrel 13 to connect the head section 15 and tubular barrel 13 together. One of the longitudinal welds 46 is shown in FIG. 1 for purposes of illustration. A bolt 47 is then disposed through the central bore 34 of lip section 33 which extends downwardly into the threaded central bore 21 of wedge nut 19 at the base of tubular barrel 13. The bolt 47 acts to connect the stem assembly 11 to the wedge nut 19, and when the wedge nut 19 is tightened relative to the chamfered end of the barrel, to secure the stems within a front wheel fork (not shown) of the frame of a bicycle.

There are several advantages in constructing a stem assembly in the manner discussed above. Both the tubular barrel 13 and head section 15 may be formed in relatively inexpensive progressive dies requiring no secondary die operations. The tubular barrel 13 of the stem assembly 11 is more rigid than in prior art designs wherein the stem assembly is a single integral piece which includes the barrel and the head section, since in this invention the tubular barrel 13 maintains its circular cross-section throughout its entire length while in prior art one piece stems, the circular configuration changes into a connecting throat area. As shown in FIG. 4, the angle at which the head section 15 is disposed relative to the tubular barrel 13 may be readily varied, as compared to the FIG. 1 configuration (shown in phantom). This permits flexibility in design of the stem assembly without costly modifications of the expensive dies used to form integral one-piece stem assemblies. Since both the tubular barrel 13 and head section 15 of this invention are formed in separate operations, the head material and barrel material need not have the same thickness. Moreover, before the head section 15 is welded to the tubular barrel 13 the seam near the barrel (see FIG. 3) may be oriented in any position to enhance the strength of the stem assembly and/or its appearance.

While the invention has been described with reference to a preferred embodiment, it will be understood by those skilled in the art that various changes may be made and equivalents may be substituted for elements thereof without departing from the scope of the invention. For example, it is contemplated that the head section 15 could be formed without a connecting lip section 33. Instead, a separate washer could be formed and placed over the planar upper end 14 of tubular barrel 13 with the head section 14 contacting the tubular barrel 13 through side sections 29, 31. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A stem assembly for securing the handlebars of a bicycle to the frame comprising:
   a tubular barrel having a longitudinal axis, a top end, and a side portion; and
   a sheet metal head section having a lip section and a pair of spaced side sections extending downwardly from and generally perpendicular to said lip section, said head section being adapted to engage said tubular barrel such that said lip section extends over said top end of said tubular barrel and said side sections of said head section abut said side portion of said tubular barrel, each of said side sections having a longitudinal edge extending generally parallel to said longitudinal axis of said barrel, said longitudinal edges of said sections being spaced from each other, said head section and tubular barrel being connected by welds between each of said longitudinal edges of said side sections of said head section and said side portion of said tubular barrel.

2. The stem assembly of claim 1 wherein said tubular barrel has a chamfer at the lower end thereof, said chamfer being adapted to contact a wedge nut for connection of said tubular barrel to said bicycle frame.

3. The stem assembly of claim 1 wherein said head section is formed in a U-shape with an upper half section and a lower half section forming an annular sleeve section, said sleeve section being adapted to receive and clamp handlebars therein, said upper and lower half sections being formed with aligning bores to receive fastening means, said fastening means being adapted to tighten said upper and lower half sections together for clamping said handlebars within said annular sleeve section.

4. The stem assembly of claim 1 wherein said tubular barrel includes a chamfer on one end adapted to engage a tapered surface of a wedge nut, said wedge nut having a threaded central bore, said wedge nut being adapted to contact and clamp said stem to a bicycle fork, said lip section of said head section having a bore, a bolt being inserted through said bore in said lip section, through said tubular barrel and threaded within said central bore of said wedge nut.

5. The stem assembly of claim 4 wherein said tubular barrel is formed from a flat section of metal stock having tapered sides at one end, said flat section being formed into a tube shape.

6. The stem assembly of claim 4 wherein said tubular barrel is cut from a length of tubing and has a chamfer adjacent one end.

7. A stem assembly for securing the handlebars of a bicycle to a bicycle frame comprising:
  a tubular barrel having a longitudinal axis, a top end, and a seam along a side portion thereof; and
  a head formed from sheet metal, said head having a lip section and a pair of spaced side sections perpendicular to said lip section, said head being adapted to engage said tubular barrel such that said lip section extends over said top end of said tubular barrel and said side sections of said head abut said side portion of said tubular barrel, each of said side sections having a longitudinal edge extending generally parallel to said longitudinal axis of said barrel, said longitudinal edges of said side sections being spaced from each other, and located on either side of said seam of said barrel, said head and tubular barrel being connected by welds between each of said longitudinal edges of said side sections of said head and said side portion of said tubular barrel.

8. A stem assembly for securing the handlebars of a bicycle to the front fork of a bicycle frame comprising:
  a tubular barrel having a longitudinal axis, a top end, and a side portion; and
  a sheet metal head having a handlebar clamping portion at one end and a lip section at the opposite end, a pair of spaced side sections extending downwardly from and generally perpendicular to said lip section, said head being adapted to engage said tubular barrel such that said lip section extends over said top end of said tubular barrel and said side sections of said head abut said side portion of said tubular barrel, each of said side sections having a longitudinal edge extending generally parallel to said longitudinal axis of said barrel, said longitudinal edges of said side sections being spaced from each other, said head and tubular barrel being connected by welds between each of said longitudinal edges of said side sections of said head and said side portion of said tubular barrel.

9. The stem assembly of claim 8 wherein said lip section is generally planar and is located in a generally horizontal plane over the top end of said tubular barrel.

10. A stem assembly for securing the handlebars of a bicycle to the front fork of a bicycle frame comprising:
  a tubular barrel having a longitudinal axis, a top end and a side portion; and
  a head formed from sheet metal, said head having a handlebar clamping portion at one end and a generally planar lip section at the opposite end, a pair of spaced side sections extending generally perpendicular to said lip section, said head engaging said tubular barrel with said lip section extending over said top end of said tubular barrel and said side sections of said head abutting said side portion of said tubular barrel, each of said side sections having a longitudinal edge extending generally parallel to said longitudinal axis of said barrel, said longitudinal edges of said side sections being spaced from each other, said head and tubular barrel being connected by welds between each of said longitudinal edges of said side sections of said head and said side portions of said tubular barrel.

11. A stem assembly for securing the handlebars of a bicycle to the front fork of a bicycle frame comprising:
  a tubular barrel having a top end and a side portion; and
  a head formed from sheet metal, said head having a handlebar clamping portion at one end and a generally planar lip section at the opposite end, a pair of spaced side sections extending generally perpendicular to said lip section, each of said side sections having an edge located in a plane generally perpendicular to said planar lip section, said edges of said side sections being spaced from each other, said head engaging said tubular barrel with said lip section extending over said top end of said tubular barrel and with said spaced edges of said side sections of said head abutting said side portion of said tubular barrel, said head and tubular barrel being connected by welds between said spaced edges of said side sections of said head and said side portion of said tubular barrel.

12. A stem assembly for securing the handlebars of a bicycle to the front fork of a bicycle frame comprising:
  a tubular barrel having a longitudinal axis, top end, and a seam along a side portion thereof; and
  a head formed from sheet metal, said head having a handlebar clamping portion at one end and a generally planar lip section at the opposite end, a pair of spaced side sections perpendicular to said lip section, said side sections each having an edge generally located in a plane which extends perpendicular to said planar lip section, said head being adapted to engage said tubular barrel such that said lip section extends over said top end of said tubular barrel and with said edge of each of said side sections of said head abutting said side portion of said tubular barrel on either side of said seam of said tubular barrel, said head and tubular barrel being connected by longitudinally extending welds between said edge of each of said side sections of said head and said side portion of said tubular barrel.

13. A stem assembly for securing the handlebars of a bicycle to the frame comprising:
  a tubular barrel having a longitudinal axis, a top end, and a side portion; and
  a sheet metal head section having a top section and a pair of spaced side sections extending downwardly from and generally perpendicular to said top section, said head section being adapted to engage said tubular barrel such that said side sections of said head section abut said side portion of said tubular barrel, each of said side sections having a longitudinal edge extending generally parallel to said longitudinal axis of said barrel, said longitudinal edges of said sections being spaced from each other, said head section and tubular barrel being connected by weld means between each of said longitudinal edges of said side sections of said head section and said side portion of said tubular barrel.

14. The stem assembly of claim 13 wherein said barrel has a seam along a side portion thereof, and
said longitudinal edges of said side sections of said head being located on opposite sides of said seam of said barrel.

15. The stem assembly of claim 13 wherein said head has a handlebar clamping portion extending from said top section.

16. The stem assembly of claim 15 wherein said handlebar clamping portion of said head is integral with said top section and is bent into a generally circular configuration to receive the handlebars of a bicycle therein.

* * * * *